(12) United States Patent
Fujimoto et al.

(10) Patent No.: US 7,627,763 B2
(45) Date of Patent: Dec. 1, 2009

(54) MULTI SIGNATURE VERIFICATION SYSTEM, ELECTRONIC SIGNATURE ATTACHING APPARATUS, DATA ADDITION APPARATUS, AND ELECTRONIC SIGNATURE VERIFICATION APPARATUS

(75) Inventors: Hiroshi Fujimoto, Yokohama (JP); Takashi Suzuki, Yokosuka (JP); Takehiro Nakayama, Yokohama (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 766 days.

(21) Appl. No.: 11/037,012

(22) Filed: Jan. 19, 2005

(65) Prior Publication Data
US 2005/0188207 A1    Aug. 25, 2005

(30) Foreign Application Priority Data
Jan. 21, 2004    (JP)    ............................. 2004-012943

(51) Int. Cl.
*H04L 9/00*    (2006.01)
(52) U.S. Cl. ..................................... 713/177
(58) Field of Classification Search .................. 713/177
See application file for complete search history.

(56) References Cited

U.S. PATENT DOCUMENTS

| | | | | | |
|---|---|---|---|---|---|
| 4,218,582 | A | * | 8/1980 | Hellman et al. | ................ 380/30 |
| 5,263,085 | A | * | 11/1993 | Shamir | ......................... 380/30 |
| 5,754,659 | A | * | 5/1998 | Sprunk et al. | .................. 380/30 |
| 5,966,445 | A | | 10/1999 | Park et al. | |
| 6,088,798 | A | * | 7/2000 | Shimbo | ...................... 713/176 |
| 6,108,783 | A | * | 8/2000 | Krawczyk et al. | ........... 713/180 |
| 6,212,637 | B1 | | 4/2001 | Ohta et al. | |
| 6,292,897 | B1 | * | 9/2001 | Gennaro et al. | ............. 713/175 |
| 7,496,759 | B2 | * | 2/2009 | Komano et al. | ............. 713/176 |
| 7,533,270 | B2 | * | 5/2009 | Gentry | ....................... 713/180 |
| 2004/0153652 | A1 | * | 8/2004 | Suga | .......................... 713/176 |
| 2005/0022102 | A1 | * | 1/2005 | Gentry | ....................... 715/500 |
| 2005/0201561 | A1 | * | 9/2005 | Komano et al. | ............. 380/255 |
| 2008/0133926 | A1 | * | 6/2008 | Gentry | ....................... 713/176 |
| 2008/0178005 | A1 | * | 7/2008 | Gentry | ....................... 713/176 |

FOREIGN PATENT DOCUMENTS

WO    WO 01/22653 A2 *    3/2001
WO    WO 03/090429 A1    10/2003

OTHER PUBLICATIONS

Bellare, Mihir et al. How to Sign Given Any Trapdoor Permutation. Jan. 1992. Journal of the Association for Computing Machinery. vol. 39, No. 1. p. 214-233.*

(Continued)

*Primary Examiner*—Christian LaForgia
(74) *Attorney, Agent, or Firm*—Oblon, Spivak, McClelland, Maier & Neustadt, L.L.P.

(57) ABSTRACT

A multi signature verification system adds new additional data to original data with a signature attached thereto and verifies validity of the original data and the additional data. The system includes an electronic signature attaching apparatus including an electronic signature attaching unit attaching an electronic signature to original data previously created, acquired trapdoor hash value, and identification information, a data addition apparatus, and an electronic signature verification apparatus.

9 Claims, 9 Drawing Sheets

OTHER PUBLICATIONS

Merkle, Ralpoh C. Hiding Information and Signatures in Trapdoor Knapsacks. Sep. 1978. IEEE Transactions on Information Theory. vol. IT-24, No. 5. p. 525-530.*

Adi Shamir, et al. "Improved Online/Offline Signature Schemes"; Advances in Cryptology. Crypto 2001, 21$^{st}$ Annual International Cryptology Conference, Santa Barbara, CA, August 19-23, 2001, Proceedings, [Lecture Notes in Computer Science; vol. 2139], Berlin: Springer, DE; Aug. 19, 2001; pp. 355-367; XP000988709.

Dan Boneh, et al. "A Survey of Two Signature Aggregation Techniques"; RSA Laboratories Cryptobytes, [Online], vol. 6, No. 2; Aug. 1, 2003; 11 pgs., XP007908032.

Anna Lysyanskaya, et al. "Sequential Aggregate Signatures from Trapdoor Permutations"; Advances in Cryptology-Eurocrypt 2004; [Lecture Notes in Computer Sciences; LNCS] Springer-Verlag, Berline/Heidelberg; vol. 3027; Apr. 17, 2004; 17 pgs.; XP019005045.

* cited by examiner

FIG. 7

```
<smil xmlns="http://www.w3.org/2001/SMIL20/Language">
    <head/>
    <body>
        <par>
            <video id="DATA ADDITION APPARATUS (1)" src=" "/>   ← PLACE HOLDER
            <video src="rtsp://cp.org/xxx.rm"/>
        </par>
    </body>
</smil>
```

FIG. 8

```
<smil xmlns="http://www.w3.org/2001/SMIL20/Language">
    <head/>
    <body>
        <par>
            <video id=DATA ADDITION APPARATUS (1) src="rtsp://ad1.org/yyy.rm"/>   ← PLACE HOLDER
            <video src="rtsp://cp.org/xxx.rm"/>
        </par>
    </body>
</smil>
```

FIG. 9

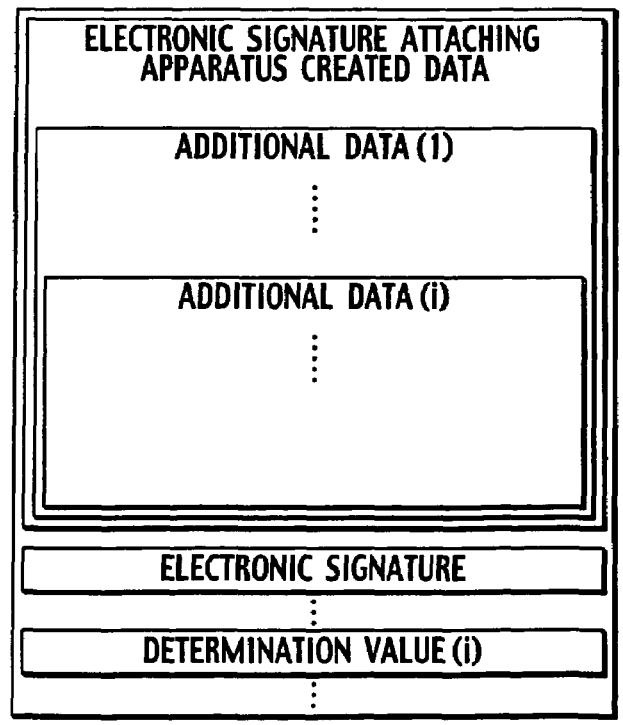

MULTI SIGNATURE VERIFICATION SYSTEM, ELECTRONIC SIGNATURE ATTACHING APPARATUS, DATA ADDITION APPARATUS, AND ELECTRONIC SIGNATURE VERIFICATION APPARATUS

CROSS REFERENCE TO RELATED APPLICATIONS

This application is based upon and claims the benefit of priority from prior Japanese Patent Application P2004-012943 filed on Jan. 21, 2004; the entire contents of which are incorporated by reference herein.

BACKGROUND OF THE INVENTION

1. Field of the Invention

The present invention relates to a multi signature verification system, an electronic signature attaching apparatus, a data addition apparatus, and an electronic signature verification apparatus.

2. Description of the Related Art

There has hitherto been multihop communication in which one or more intermediate nodes are located between a data sender as an initial node and a data receiver as a final node and add or transfer data. For example, a case is considered in which an account information creator, which is the intermediate node, attaches account information to a request of a user to a content provider according to the requested content or a destination of the request. In this case, the content provider or an account agent server charges the user based on the attached account information. Herein, if the charging side can trust the user, the charge is smoothly made. If the charging side cannot trust the user, however, it is required to clarify the origin of the message, that is, clarify that the request is surely created by the user.

In order to clarify the origin of the message, there are methods of establishing a secure communication path between each terminal by using a technology such as IPSec or SSL for mutual authentication and of giving a creator's electronic signature to the message. In the former, the terminals need to be simultaneously online for authentication. In the latter, the time when the signature is attached to the content and the time when the receiver of the message verifies the signature may be different from each other, and the verification process can be carried out at any time. For example, there is an advantage in that the load can be distributed.

In the case of using the electronic signature among the above examples, the user attaches a signature to the created request, and the account information creator also attaches a signature to the account information created. The charging side can therefore charge in spite of the reliability of the terminals, and the user cannot repudiate the request. Several technologies for signing and verifying data added in multiple steps in such a manner have been contrived.

For example, a multi signature system is disclosed in which a second signer adds data to original data signed and outputted by a first signer and attaches a signature to the additional data. In the same manner, an i-th signer having received data from an $(i-1)$-th signer adds data to the received data, attaches a signature to the additional data, and then outputs the data to the $(i+1)$-th signer (for example, see the Japanese Patent Laid-Open Publication No. 2002-40935, hereinafter, referred to as Literature 1). The verifier can thus verify the signatures for the data added in several steps. Hereinafter, a description is given of this signature system for the i-th signer.

In the case of adding data to the inputted data, the i-th signer takes difference data mi between the data after addition and the data before addition. The signature is created by performing an operation which allows an inverse operation for combination data including a hash value of this mi and the IDi of the signer and an $(i-1)$-th determination value, and encrypting the obtained data with a secret key. The first i pieces of difference data, the first i IDs, and the i-th determination value are outputted to the $(i+1)$-th signer. The verifier having received the data from an n-th signer decodes an n-th determination value using a public key and performs an inverse operation $f^{-1}$ for the obtained value to derive the $(n-1)$-th determination value. This is repeated to obtain the combination data of the data m1 added by the first signer and the ID1. When this combination data is equal to the combination data of m1 and ID1 included in the original input data, the validity of the input data is guaranteed.

Another multi-signature scheme is disclosed, in which a first signer creates a signature d1 for created data M1 and sets d=d1 as a signature attached to M1 (For example, see D. Boneh, C. Gentry, B. Lynn, and H. Shacham, Aggregate and verifiably encrypted signatures from bilinear maps in Proc. of Eurocrypt 2003, volume 2656 of LNCS, pages 416-432, Springer-Verlag 2003 (Hereinafter, referred to as Literature 2)). After creating data M2, a second signer having acquired (M1, d) creates a signature d2 for M2. Thereafter, d is set to d1·d2 as a signature associated with M1 and M2. In the same manner, after creating data Mn, an n-th signer having acquired (M1, M2, M3, . . . , Mn−1, d) creates a signature dn for Mn. Subsequently, d is set as the following equation.

$$\delta = \Pi_{i=1}^{n} \delta i$$

This d is set as a signature for M1, M2, . . . , and Mn. The verifier side multiplies each piece of signed data and the value obtained from the public key of each signer and compares the result thereof and the determination value to carry out verification.

SUMMARY OF THE INVENTION

In the Literature 1, a method is adopted in which the signer attaches a signature to additional data by use of the determination value attached to the inputted data. If certain added data and the determination value attached thereto are removed, it can be detected by verification on the verifier side that the added data is removed.

In the Literature 2, length of signatures can be shortened by combining the signatures attached to the data.

However, it is generally known that the attachment of a signature takes a long time to calculate. In these multi signature systems, electronic signatures are attached in multiple steps, which could increase the overhead.

Accordingly, the present invention was made in the light of the aforementioned problem, and an object of the present invention is to provide a multi signature verification system, an electronic signature attaching apparatus, a data addition apparatus, and an electronic signature verification apparatus which can shorten a processing time required for signing when adding data to original data.

A first aspect of the present invention is to provide a multi signature verification system adding new additional data to original data with a signature attached thereto and verifying validity of the original data and the additional data, the system, including, a) an electronic signature attaching apparatus including an electronic signature attaching unit attaching an electronic signature to original data previously created, acquired trapdoor hash value, and identification information;

b) a data addition apparatus including: a data adding unit adding new created data and the identification information to the original data as additional data; and a determination value calculating unit calculating a determination value by use of secret information, the determination value making an output of a trapdoor hash function equal to the trapdoor hash value when being inputted in the trapdoor hash function together with the additional data and the trapdoor hash value; and c) an electronic signature verification apparatus including: a trapdoor hash value calculating unit calculating the trapdoor hash value based on the additional data and the determination value; and a verifying unit verifying the validity of the additional data by the trapdoor hash value calculated by the trapdoor hash value calculating unit, wherein the identification information identifies the data addition apparatus which has created the trapdoor hash value.

A second aspect of the present invention is to provide an electronic signature attaching apparatus attaching an electronic signature, including, a) an acquiring unit acquiring a trapdoor hash value and identification information specifying a data addition apparatus which has created the trapdoor hash value; b) an electronic signature attaching unit attaching an electronic signature to original data previously created, the trapdoor hash value, and the identification information; and c) an outputting unit outputting the original data and identification information with the electronic signature attached thereto to the data addition apparatus.

A third aspect of the present invention is to provide a data addition apparatus attaching new data to original data created in the electronic signature attaching apparatus, including, a) a trapdoor hash value creating unit creating a trapdoor hash value; b) a first outputting unit outputting the trapdoor hash value and identification information identifying a data addition apparatus which has created the trapdoor hash value; c) a data adding unit adding new created data and the identification information to the original data as additional data; d) a determination value calculating unit calculating a determination value by use of secret information, the determination value making an output of a trapdoor hash function equal to the trapdoor hash value when being inputted in the trapdoor hash function together with the additional data and the trapdoor hash value; and e) a second outputting unit outputting the additional data and the determination value.

A forth aspect of the present invention is to provide an electronic signature verification apparatus verifying validity of original data with an electronic signature attached thereto and additional data newly added to the original data, the apparatus including, a) a data acquiring unit acquiring the additional data and a determination value which makes an output of a trapdoor hash function equal to the trapdoor hash value when being inputted in the trapdoor hash function together with the additional data and the trapdoor hash value; b) a trapdoor hash value calculating unit calculating a trapdoor hash value based on the additional data and the determination value; and c) a verifying unit verifying the validity of the additional data based on the trapdoor hash value calculated by the trapdoor hash value calculating unit.

BRIEF DESCRIPTION OF DRAWINGS

FIG. 7 is an example of a SMIL document including a place holder according to the second embodiment.

FIG. 8 is an example with the place holder having data in FIG. 7.

FIG. 9 is an example of a data structure in a case of forming place holders according to the second embodiment in multiple steps.

DETAILED DESCRIPTION OF THE INVENTION

Figure 1:
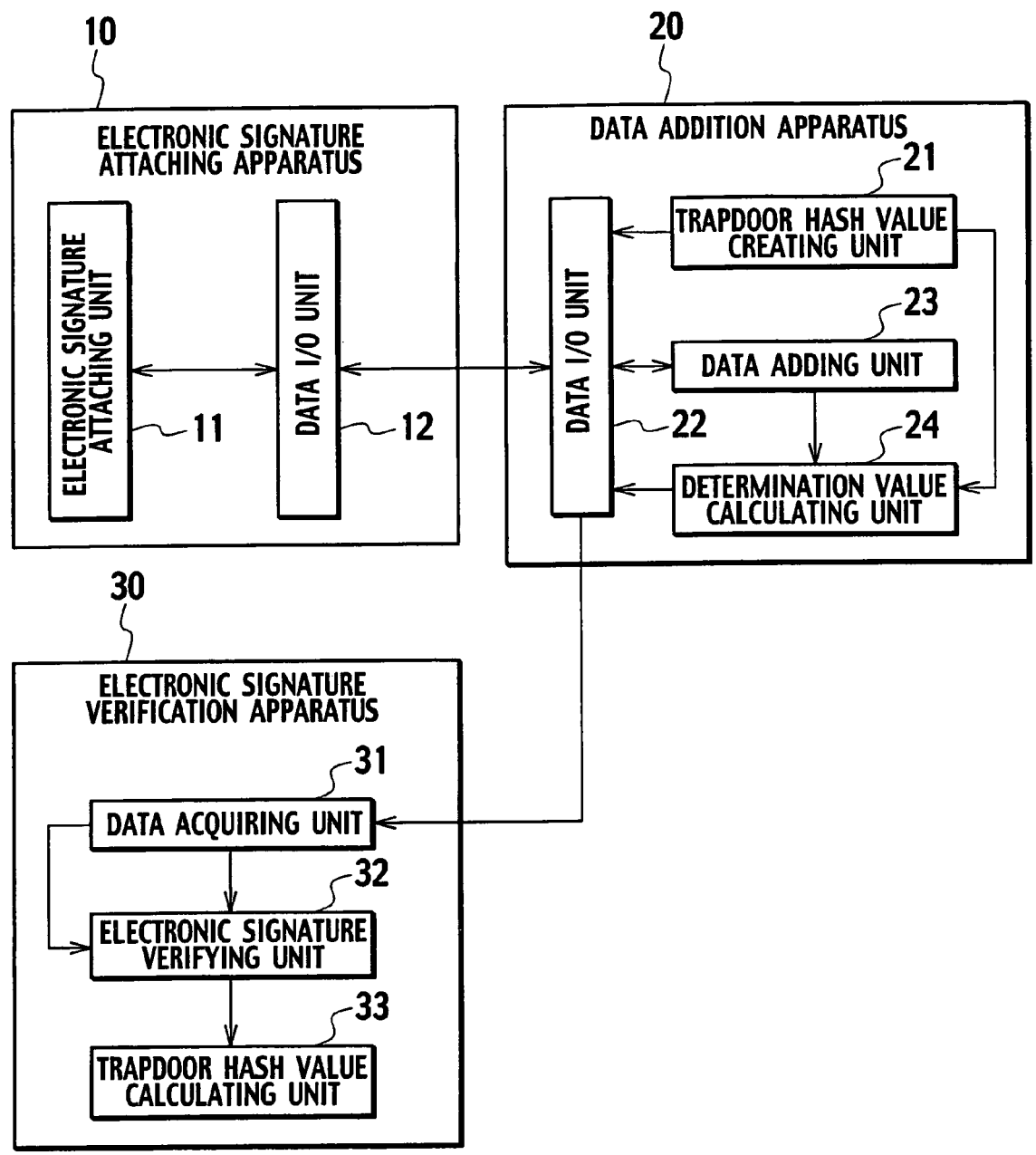
FIG. 1 is a block diagram of a multi signature verification system according to a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First, a description is given of a trapdoor hash function and a trapdoor hash value used in the embodiments. Hereinafter, y is a hash key, and x is a secret key. The former is public information, and the latter is secret information. Table 1 shows values related to the trapdoor hash function.

TABLE 1

| VALUES RELATED TO TRAPDOOR HASH FUNCTION | |
|---|---|
| VALUE | EXPLANATION |
| q | Large enough prime number properly selected |
| k | Proper natural number |
| p | Prime number satisfying kq + 1 |
| m' | Randomly selected from a reduced residue system modulo q |
| r' | Randomly selected from a reduced residue system modulo 1 |
| g | Number satisfying $g^q = 1 (MOD\ p)$ |
| x | Secret key randomly selected from the reduced residue system modulo q |
| y | Public key derived by $y = g^x (mod\ p)$ |
| $h_y$ | Trapdoor hash function corresponding to the public key y |
| $h_y(m', r')$ | Trapdoor hash value for m' and r' as inputs |
| m | Any value belonging to the reduced residue system modulo q |
| r | When r is inputted in $h_y$ together with m, the output of $h_y$ is equal to $h_y(m', r')$ |

The trapdoor hash value is a value of the trapdoor hash function hy accompanied with y when two numbers are inputted, which is expressed by $h_y(m, r)$, and satisfies the following characteristics.

1) When only y and $h_y(m', r')$ are given, it is very difficult to derive a pair of m and r which satisfies $h_y(m, r) = h_y(m', r')$.
2) When x is given, r satisfying $h_y(m', r') = h_y(m, r)$ can be derived for any m using x, m', and r'.

As described above, hash functions capable of intentionally creating a collision by use of certain secret information (herein, the secret key x) are collectively referred to as trapdoor hash functions. The trapdoor hash function involves at least two inputs.

Next, a description is given of the following three processes related to the trapdoor hash function.

1) Derivation of trapdoor hash value
   (a) q, k, p, m', r' and X as shown in Table 1 are selected, and g and y are derived.
   (b) $h_y$ is set as $h_y=h_y(m', r')=g^{m'}y^{r'}(\mod p)$, which is the trapdoor hash value.
2) Detection of collision ($h_y$, m', r', q, and x are given)
   (a) any m is selected.
   (b) r satisfying $m+xr=m'+xr'(\mod p)$ is derived. This r satisfies $h_y(m', r')=h_y(m, r)$.
3) Verification of trapdoor hash value (g, p, y, m, r, $h_y$ (m', r') are given)
   (a) Whether $h_y(m, r)=g^{m}y^{r}(\mod p)=h_y(m', r')$ or not is verified.

The following description is given of the embodiments of the present invention using the trapdoor hash function described above as the example. The present invention can be realized using not only the trapdoor hash function described above as the example but also any function having the characteristics of the trapdoor hash function.

FIRST EMBODIMENT

A multi signature verification system according to a first embodiment includes, as shown in FIG. 1, an electronic signature attaching apparatus 10, a data addition apparatus 20, and an electronic signature verification apparatus 30. For exchanging data among the electronic signature attaching apparatus 10, data addition apparatus 20, electronic signature verification apparatus 30, the data can be directly exchanged between each apparatus or exchanged via a communication network. Herein, the "communication network" includes the Internet, a mobile network, and a public telephone network.

The electronic signature attaching apparatus 10 acquires a trapdoor hash value created by the data addition apparatus 20 and parameters necessary for deriving a trapdoor hash value, attaches a signature to these values and original data previously created by the electronic signature attaching apparatus 10, and outputs these values to the data addition apparatus 20.

The data addition apparatus 20 acquires the data including the trapdoor hash value and parameters and adds created data to the acquired data as additional data. The data addition apparatus 20 calculates a determination value using secret information such that an output obtained by inputting the determination value and the additional data in the trapdoor hash value function is equal to the trapdoor hash value. The determination value is outputted to the electronic signature verification apparatus 30 together with the acquired data.

The electronic signature verification apparatus 30 acquires the data with the electronic signature attached thereto, derives a trapdoor hash value from the parameters and determination value included in the acquired data. The electronic signature verification apparatus 30 compares the derived trapdoor hash value and the trapdoor hash value included in the inputted data to verify the validity of the additional data. In addition, the signature attached to the trapdoor hash value, the parameters, and the original data of the electronic signature attaching apparatus 10 is verified, and the validity of the trapdoor hash value and original data is thus verified.

Hereinafter, the configurations of the electronic signature attaching apparatus 10, data addition apparatus 20, and electronic signature verification apparatus 30 are described in more detail.

The electronic signature attaching apparatus 10 includes an electronic signature attaching unit 11 and a data input/output unit 12.

The data input/output unit 12 acquires the trapdoor hash value and parameters outputted from the data addition apparatus 20. The acquiring method is direct input from the data addition apparatus 20 through communication or acquisition of the data previously registered on a network. Specifically, the trapdoor hash value is $h_y(m', r')$, and the parameters are g, p, and y.

The electronic signature attaching unit 11 attaches a signature to the original data previously created, parameters, and trapdoor hash value by a conventional electronic signature technology.

The data input/output unit 12 outputs the original data, the parameters, the trapdoor hash value, and the signature attached thereto to the data addition apparatus 20.

The electronic signature attaching apparatus 10 includes a not-shown data holding unit to hold the trapdoor hash value, parameters, original data inputted from the data addition apparatus 20. The data holding unit is a recording medium such as RAM, ROM, a hard disk, a flexible disk, a compact disk, an IC chip, and a cassette tape.

The data addition apparatus 20 includes a trapdoor hash value creating unit 21, a data input/output unit 22, a data adding unit 23, and a determination value calculating unit 24.

The trapdoor hash value creating unit 21 creates the values listed in the Table 1 except m and r. The trapdoor hash value transfers the trapdoor hash value and parameters to the data input/output unit 22 and transfers the secret key and values necessary for calculating the determination value r to the determination value calculating unit 24. Specifically, the secret key is x, and the values necessary for calculating the determination value are m', r', and q.

The data input/output unit 22 outputs the trapdoor hash value and parameters. The outputting method is direct output of these values to the electronic signature attaching apparatus 10 through communication or register of these values on a network.

The data adding unit 23 sets created data as the additional data, and the data input/output unit 22 adds the additional data to the data acquired from the electronic signature attaching apparatus 10. Specifically, the additional data is m.

The determination value calculating unit 24 creates a determination value r from x, m, m', r', and q, and the data input/output unit 22 outputs the acquired data with the additional data added thereto and the determination value r together to the electronic signature verification apparatus 30.

The data addition apparatus 20 includes a not-shown data holding unit to hold the trapdoor hash value, the secret key, the determination value r, and the like listed in the Table 1 and the additional data. The data holding unit is a recording medium such as RAM, ROM, a hard disk, a flexible disk, a compact disk, an IC chip, and a cassette tape.

The electronic signature verification apparatus 30 includes a data acquiring unit 31, an electronic signature verifying unit 32, and a trapdoor hash value calculating unit 33.

The data acquiring unit 31 acquires the data and determination value outputted from the data addition apparatus 20.

The electronic signature verifying unit 32 verifies the validity of the original data, trapdoor hash value, and parameters based on the electronic signature included in the acquired data and attached by the electronic signature attaching apparatus 10.

The trapdoor hash value calculating unit 33 calculates a trapdoor hash value $h_y(m, r)$ based on the additional data, parameters, and determination value included in the acquired data. This value is then compared with the trapdoor hash value included in the acquired data to be verified. Herein, when these values are the same and the validity of the trapdoor hash value and parameters have been verified by the electronic signature verifying unit 32, the additional data is also valid. The aforementioned two-step verification guarantees the validity of the original data of the electronic signature attaching apparatus 10 and the additional data of the data addition apparatus 20.

The electronic signature verification apparatus 30 includes a not-shown data holding unit to hold the acquired data inputted from the data addition apparatus and the like. The data holding unit is a recording medium such as RAM, ROM, a hard disk, a flexible disk, a compact disk, an IC chip, and a cassette tape.

In the aforementioned embodiment, the electronic signature attaching apparatus 10 and the data addition apparatus 20 output the parameters and the trapdoor hash value. However, apparent from the verification method, these values are needed only in verification. Accordingly, each of the electronic signature attaching apparatus 10 and the data addition apparatus 20 may output an identifier if the identifier can uniquely identify the trapdoor hash value and the parameters and the electronic signature verification apparatus 30 can acquire the trapdoor hash value and parameters using the identifier.

Figure 2:
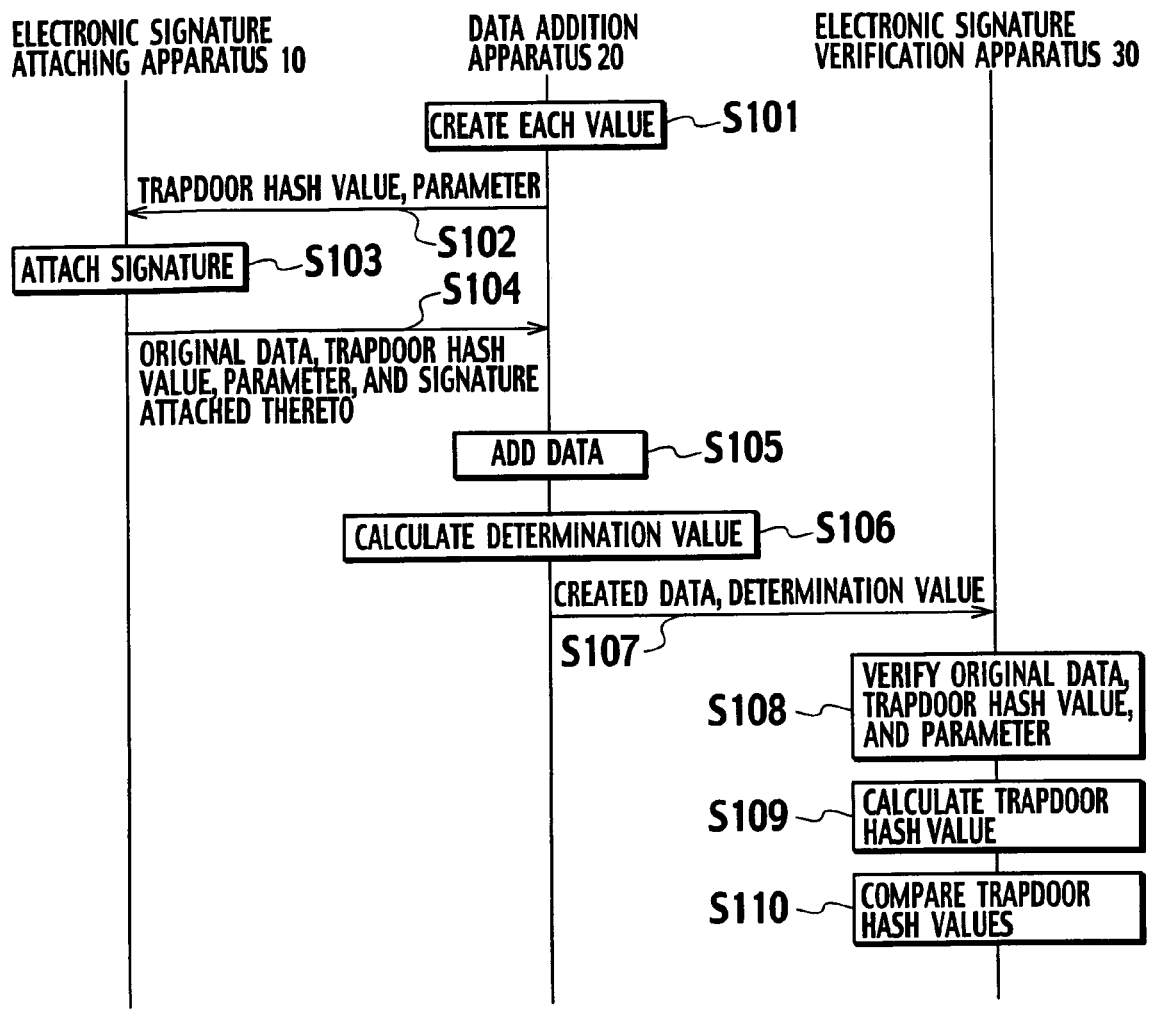
FIG. 2 is a flowchart showing a multi signature verification method according to the first embodiment.

Next, a description is given of a multi signature verification method according to the first embodiment using FIG. 2.

(a) First, in step S101, the data addition apparatus 20 creates the values shown in Table 1. In step S102, the trapdoor hash value and parameters are outputted to the electronic signature attaching apparatus 10.

(b) Next, in step S103, the electronic signature attaching apparatus 10 attaches a signature to the original data previously created by the electronic signature attaching apparatus 10, the trapdoor hash value, and the parameters. In step S104, the data and the signature are outputted to the data addition apparatus 20.

(c) Next, in step S105, the data addition apparatus 20 sets the created data as the additional data and adds the additional data to the data acquired from the electronic signature attaching apparatus 10. In step S106, using the secret information, the determination value is calculated such that an output obtained by inputting the determination value and the additional data in the trapdoor hash value function is equal to the trapdoor hash value. In step S107, the additional data with the determination value attached thereto is outputted together with the original data, parameters, and trapdoor hash value with the electronic signature attached thereto to the electronic signature verification apparatus 30.

Figure 3:
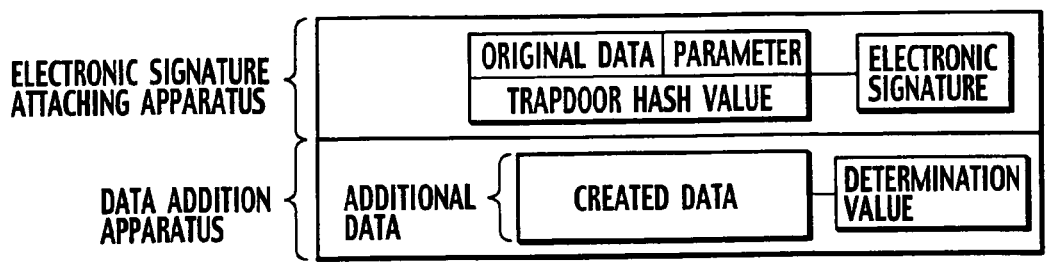
FIG. 3 is an example of data acquired by an electronic signature verification apparatus according to the first embodiment.

(d) The data acquired by the electronic signature verification apparatus 30 has a data structure shown in FIG. 3. Specifically, the original data, parameters, trapdoor hash value with the electronic signature attached thereto and the additional data with the determination value attached thereto. In step S108, the electronic signature verification apparatus 30 verifies the validity of the original data, trapdoor hash value, and parameters based on the electronic signature provided by the electronic signature attaching apparatus 10.

(e) Next, in step S109, the electronic signature verification apparatus 30 calculates the trapdoor hash value $h_y(m, r)$ based on the additional data, parameters, and determination value included in the acquired data. In step S110, the thus calculated trapdoor hash value is compared with the trapdoor hash value included in the acquired data. Herein, when these trapdoor hash values are the same and the validity of the trapdoor hash value and the parameters are verified in the step S108, the additional data is also valid. The two step verification of steps S108 and S110 guarantees the validity of the original data of the electronic signature attaching apparatus 10 and the additional data of the data addition apparatus 20.

With the multi signature verification system according to the first embodiment, the data addition apparatus does not need to attach an electronic signature to the additional data when adding data to the original data with a signature attached thereto. Accordingly, the time required to calculate a signature can be shortened. In the multi signature verification system according to the first embodiment, the identification information is parameters created when the trapdoor hash value is created. The electronic signature verification apparatus can therefore calculate the trapdoor hash value using the parameters.

With the electronic signature attaching apparatus according to the first embodiment, it is possible to attach the electronic signature to the original data, identification information (parameters), and trapdoor hash value. In addition, with the electronic signature attaching apparatus according to the first embodiment, the identification information (parameters) and trapdoor hash value can be inputted through a communication network.

With the data addition apparatus according to the first embodiment, attaching the determination value, instead of the electronic signature, can shorten the time required to sign, and the validity of the created data can be guaranteed by the determination value. Moreover, with the data addition apparatus according to the first embodiment, the identification information (parameters) and trapdoor hash values can be outputted through a communication network.

With the electronic signature verification apparatus according to the first embodiment, the validity of the original data and additional data can be verified by the electronic signature and trapdoor hash value. More specifically, with the electronic signature verification apparatus according to the first embodiment, the validity of the original data is verified by the electronic signature, and the validity of the additional data can be verified by comparing the trapdoor hash value included in the acquired data and the calculated trapdoor hash value. Moreover, the electronic signature verification apparatus according to the first embodiment may be adapted to acquire the trapdoor hash value and parameters using an identifier which can uniquely identify the trapdoor hash value and parameters. In this case, even when the trapdoor hash value, parameters, and the like are not included in the acquired data, the trapdoor hash value can be calculated by acquiring the same using the identifier.

SECOND EMBODIMENT

Figure 4:
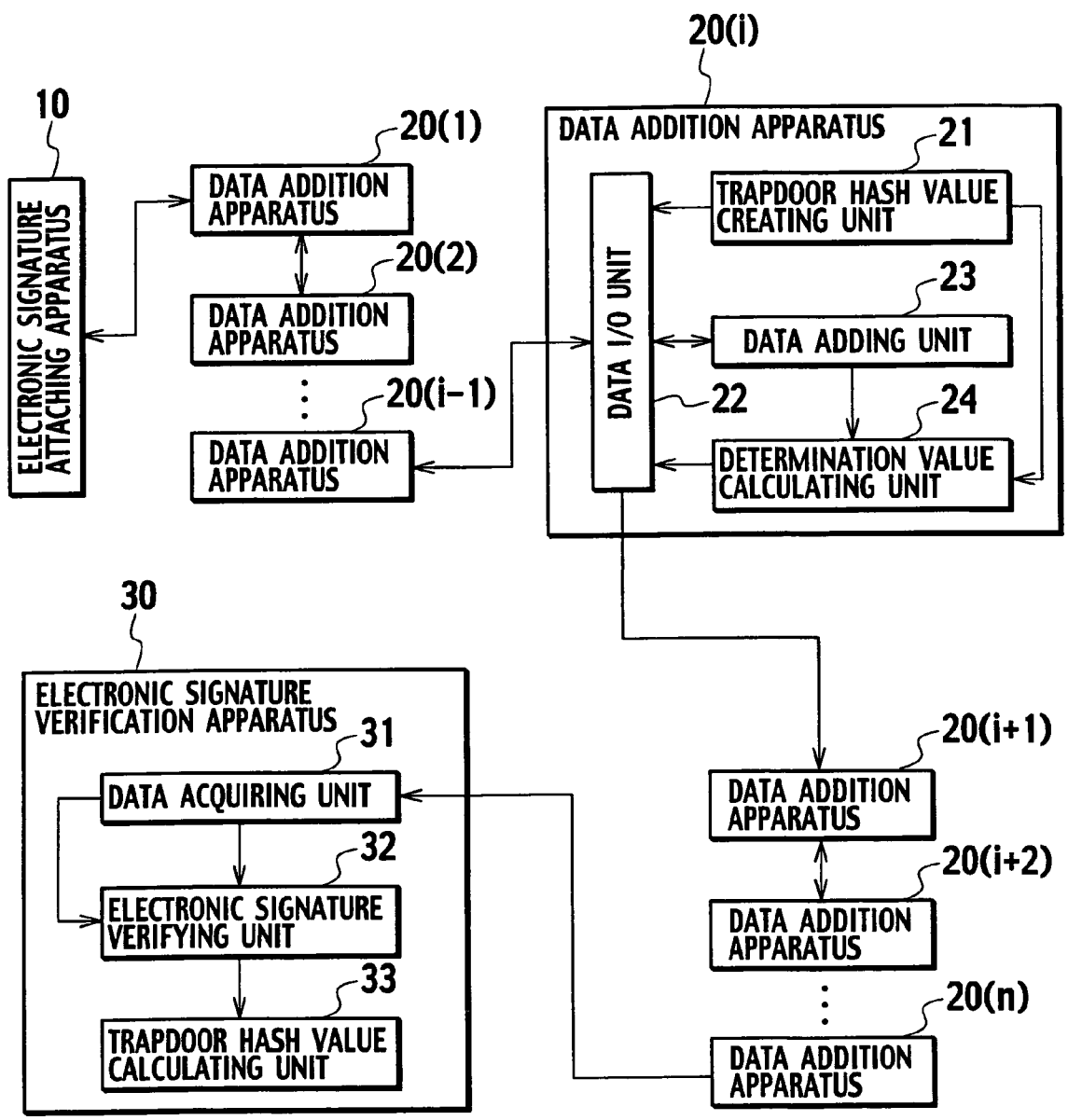
FIG. 4 is a block diagram of a multi signature verification system according to a second embodiment.

A multi signature verification system according to a second embodiment, as shown in FIG. 4, includes the electronic signature attaching apparatus 10, n (n is a natural number) data addition apparatuses 20, and the electronic signature verification apparatus 30. In the following description, a data addition apparatus which adds data i-th, the created data previously created by the data addition apparatus, the additional data added by the data addition apparatus, and the trapdoor hash value, identification information, and determination value created by the data addition apparatus 20 are followed by (i). Each value related to the trapdoor hash value created by the data addition apparatus 20(i) is described with a suffix like xi and yi.

The operation of the electronic signature attaching apparatus 10 is the same as that of the first embodiment, and the description thereof is omitted.

When i is not less than 1 and not more than n−1, the data addition apparatus 20(i) outputs a created trapdoor hash value (i) and parameters(i) and acquires data including the same. Moreover, the data addition apparatus 20(i) sets a trapdoor hash value(i+1) and parameters(i+1) acquired from the data addition apparatus 20(i+1) and created data(i) previously created by the data addition apparatus 20(i) as the additional data(i) and adds the additional data to the acquired data. Furthermore, the determination value(i) is derived using the secret information such that an output obtained by inputting the determination value(i) and the additional data(i) in the trapdoor hash value function is equal to the trapdoor hash value and outputted together with the acquired data. The data addition apparatus 20(n) operates in the same manner as the aforementioned data addition apparatus 20(i) except that the additional data(n) includes only the created data(n).

The trapdoor hash value calculating unit 33 of the electronic signature verification apparatus 30 derives the trapdoor hash value(i) based on the parameters(i), additional data(i), and determination value(i) included in the acquired data and compares the thus derived trapdoor hash value(i) with the trapdoor hash value(i) included in the acquired data for verification, which is repeated from i=1 through i=n. The operation of the electronic signature verifying unit 32 is the same as that of the first embodiment.

The following description is given of the data addition apparatus 20(i) and the trapdoor hash value calculating unit 33 of the electronic signature verification apparatus 30 in detail.

Figure 5:
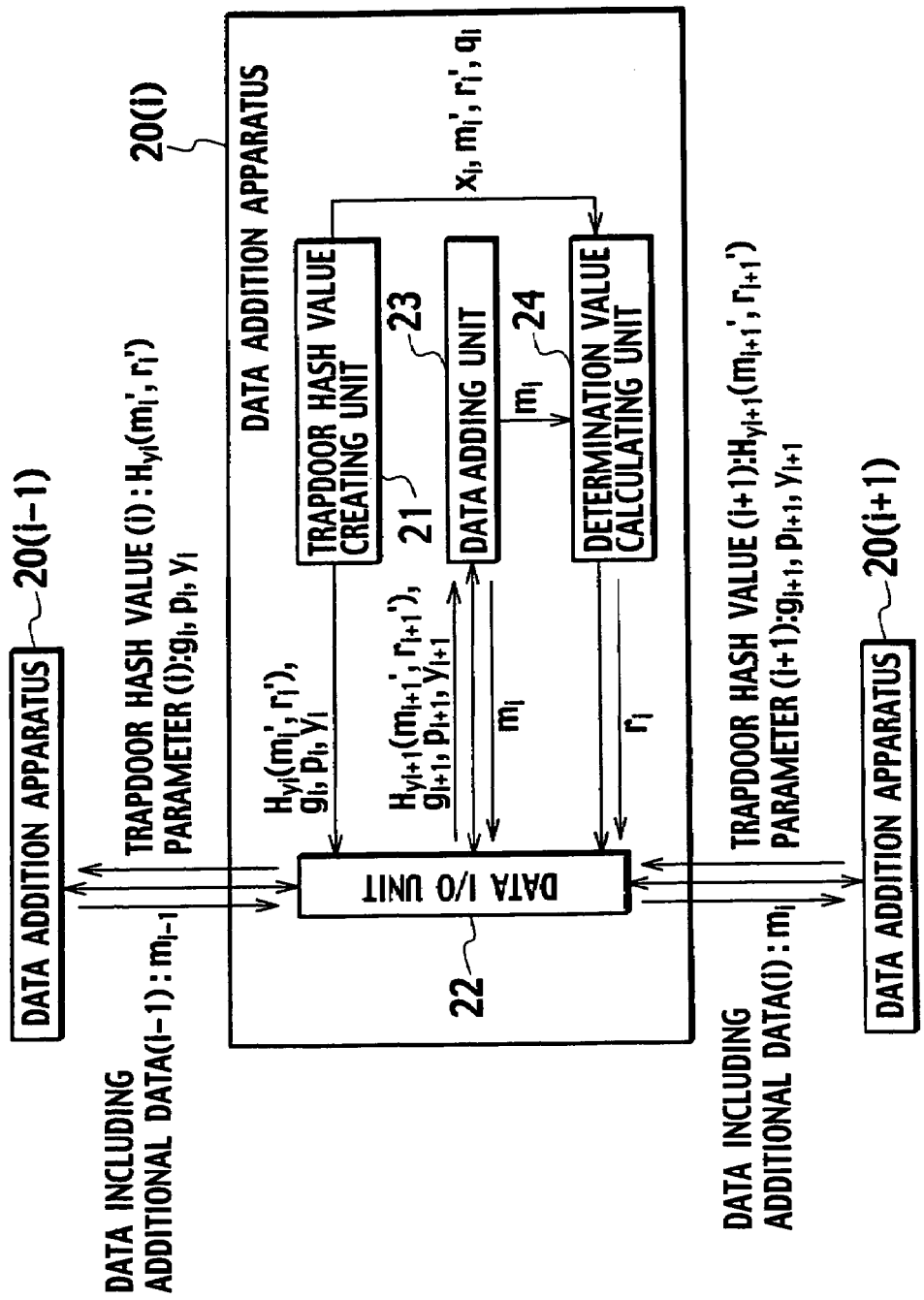
FIG. 5 is a view explaining a flow of data between data addition apparatuses according to the second embodiment.

FIG. 5 shows a flow of information among the data addition apparatus 20(i−1), the data addition apparatus 20(i), and the data addition apparatus 20(i+1). The trapdoor hash value creating unit 21 of the data addition apparatus 20(i) creates each value listed in the Table 1. The trapdoor hash value creating unit 21 transfers the trapdoor hash value(i) and the parameters(i) to the data input/output unit 22 and transfers the secret key and the values necessary for calculating $r_i$, which is the determination value, to the determination value calculating unit 24. Specifically, the secret key is $x_i$, and the values necessary for calculating the determination value are $m_i'$, $r_i'$, and $q_i'$. The data input/output unit 22 outputs the trapdoor hash value(i) and the parameters(i). Specifically, the trapdoor hash value(i) is $h_{yi}(m_i', r_i')$, and the parameters(i) are $g_i$, $p_i$, and $y_i$. The data addition apparatus 23 sets the created data(i) and the trapdoor hash value(i+1) and parameters(i+1) which the data input/output unit 22 acquires from the data addition apparatus(i+1) as the additional data(i) and adds the additional data to the data acquired from the data addition apparatus(i−1). Specifically, the trapdoor hash value(i+1) is $h_{yi+1}(m_{i+1}', r_{i+1}')$, the parameters(i+1) are $g_{i+1}$, $p_{i+1}$, and $y_{i+1}$, and the additional data(i) is $m_i$. The determination value calculating unit 24 creates $r_i$ as the determination value(i) from $x_i$, $m_i$, $m_i'$, $r_i'$, and $q_i$. The data input/output unit 22 outputs the acquired data with the additional data(i) added thereto and the determination value(i) together to the data addition apparatus (i+1). Herein, the data addition apparatus(i) and the data addition apparatus(j) may be a same data addition apparatus when i and j are different natural numbers not more than n. In this case, the aforementioned operation is separately carried out for the additional data(i) and the additional data(j).

Figure 6:
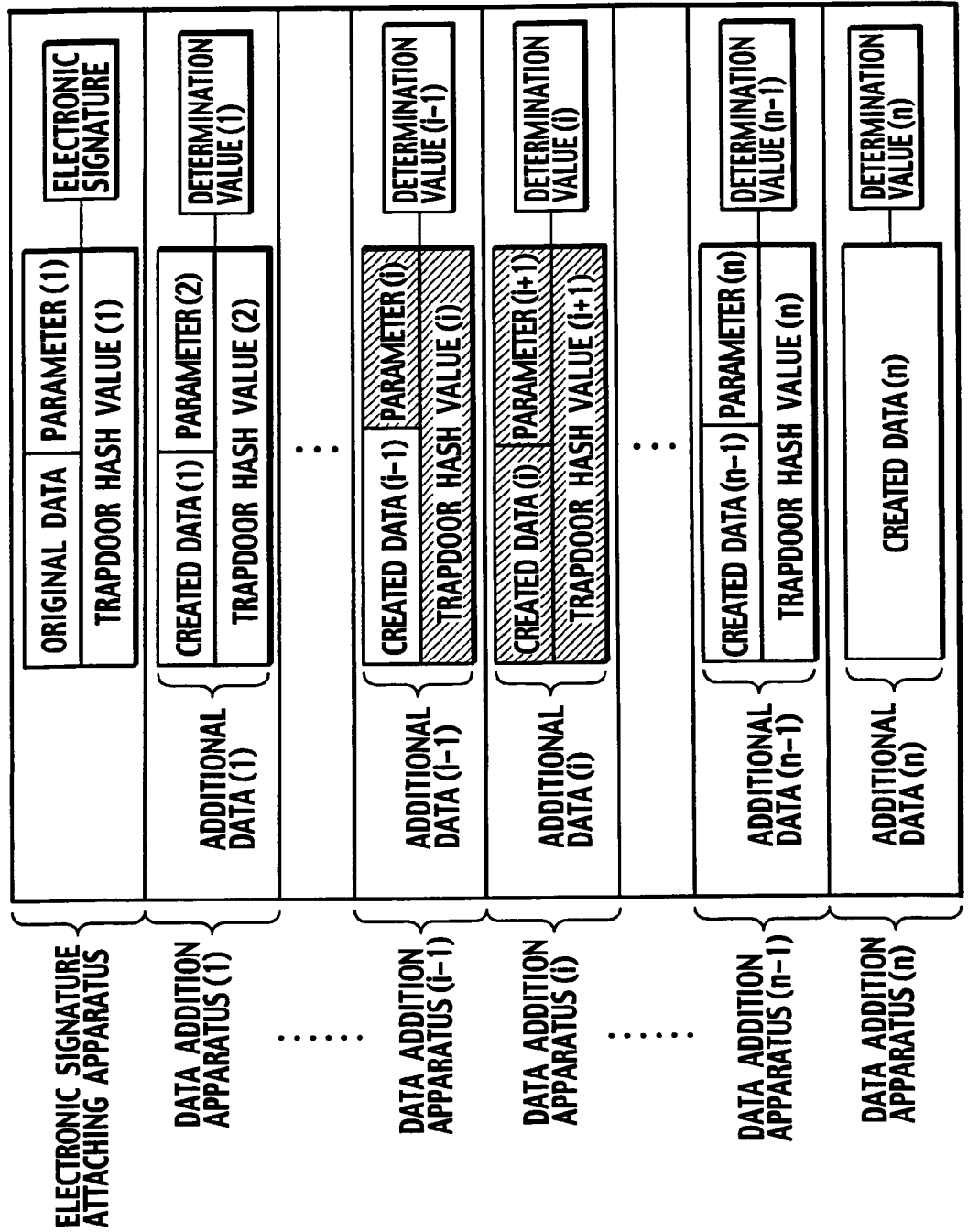
FIG. 6 is an example of data acquired by an electronic signature verification apparatus according to the first embodiment.

FIG. 6 shows acquired data of the electronic signature verification apparatus 30. The acquired data includes data outputted by the electronic signature attaching apparatus 10 and each data addition apparatus 20(i).

The trapdoor hash value calculating unit 33 of the electronic signature verification apparatus 30 calculates the trapdoor hash value(i) from the parameters(i), determination value(i), and additional data(i) included in the acquired data acquired by the data acquiring unit 31. Specifically, the calculated trapdoor hash value(i) is $h_{yi}(m_i, r_i)$. Similar to the first embodiment, this value is compared with the trapdoor hash value(i) included in the acquired data to be verified. When these values are the same and the validity of the additional data(i−1) has been verified, the validity of the trapdoor hash value(i) and parameters (i) included in the additional data(i−1) is verified, and the additional data(i) is verified to be valid. The trapdoor hash value calculating unit 33 verifies the validity of all the pieces of additional data by sequentially performing the aforementioned verification from i=1 to n.

In the second embodiment, the electronic signature attaching unit 11 of the electronic signature attaching apparatus 10 creates a place holder which specifies a place where the data addition apparatus 20 adds data. The data adding unit 23 of the data addition apparatus 20(i) inserts the additional data to the place holder when the data with the identification information attached thereto includes the place holder. The place holder is a template or the like for data insertion and should specify a place where the data addition apparatus 20 adds data. For example, in the case where the data is a SMIL document and the template is used, in the SMIL document shown in FIG. 7, the electronic signature attaching apparatus 10 and the data addition apparatus 20(i) create an element <video> including an ID specifying the data addition apparatus 20 and sets an attribute src to void. The data addition apparatus 20(i+1) having acquired this SMIL document adds a URL as the created data to the attribute src of an element including its own ID in the acquired SMIL document having the place holder. For example, the SMIL document is as shown in FIG. 8 after the created data is added thereto. If the plurality of data addition apparatuses 20(i) output the place holders in multiple steps, data is added in a nested manner, resulting in a data structure shown in FIG. 9.

In the first embodiment, the electronic signature attaching apparatus 10 or data addition apparatus 20 may output the place holder for specifying the place where the additional data is inserted.

With the multi signature verification system according to the second embodiment, when the plurality of data addition apparatuses add data to the original data with the signature attached thereto, it is not necessary to attach the electronic signature to each piece of additional data, and the calculation time required for signing can be shortened. With the electronic signature attaching apparatus according to the second embodiment, the place where the additional data is inserted can be specified.

With the data addition apparatuses according to the second embodiment, the determination value is attached in each of the plurality of data addition apparatus instead of the electronic signature, and the time for signing can be shortened. The validity of the created data can be guaranteed with the determination value. With the data addition apparatuses according to the second embodiment, the place where the additional data is inserted can be specified.

With the electronic signature verification apparatus according to the second embodiment, the validity of each piece of additional data can be verified when the additional data includes the trapdoor hash value. In the case where the additional data is falsified, it can be detected by the sequential verification from the first trapdoor hash value can detect which additional data is falsified and from which data addition apparatus the data falsified is outputted.

THIRD EMBODIMENT

Figure 10:
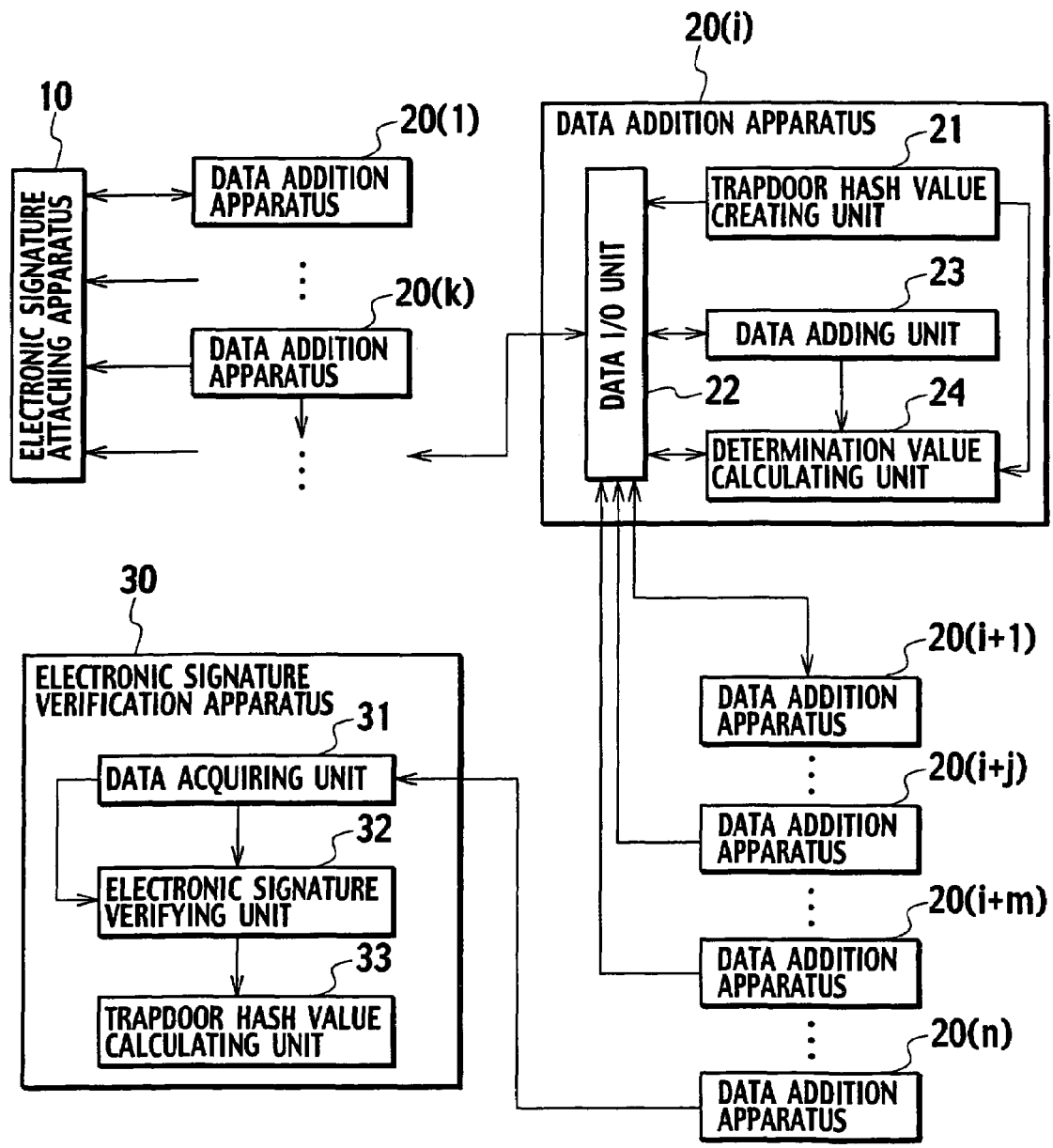
FIG. 10 is a block diagram of the multi signature verification system according to a third embodiment.

A multi signature verification system according to the third embodiment includes, as shown in FIG. 10, the electronic signature attaching apparatus 10, n (n is a natural number) data addition apparatuses 20, and the electronic signature verification apparatus 30. In the third embodiment, the electronic signature attaching apparatus 10 or data addition apparatus 20(i) acquires the trapdoor hash value and the parameters from the plurality of data addition apparatuses 20. Hereinafter, the electronic signature attaching apparatus 10 and the data addition apparatus 20(i) are described in detail.

First, a description is given of a case where the electronic signature attaching apparatus 10 acquires the trapdoor hash values and the parameters from the plurality of data addition apparatuses 20. The configuration of the electronic signature attaching apparatus 10 is the same as that of FIG. 1.

The data input/output unit 12 of the electronic signature attaching apparatus 10 acquires a trapdoor hash value(1) to a trapdoor hash value(k) and parameters(1) to parameters(k) outputted by the data addition apparatuses 20(1) to 20(k), respectively. Herein, k is a natural number not more than n. The electronic signature attaching unit 11 attaches a signature to the original data of the electronic signature attaching apparatus 10, the trapdoor hash value(1) to trapdoor hash value(k), and the parameters(1) to parameters(k). The data input/output unit 12 outputs the original data, the parameters(1) to parameters(k), and the trapdoor hash value(1) to trapdoor hash value(k) to the data addition apparatus 20(1).

When i is not more than k, the data input/output unit 22 of the data addition apparatus 20(i) outputs the trapdoor hash value(i) and parameters(i) created by the trapdoor hash creating unit 21 to the electronic signature attaching apparatus 10. In the case of i being not more than k−1, when the data input/output unit 22 of the data addition apparatus 20(i) acquires data including the trapdoor hash value(i) and parameters(i) from the electronic signature attaching apparatus 10 or the data addition apparatus(i−1), the data already includes the trapdoor hash value(i+1) and the parameters(i+1), and the created data(i) is set as the additional data(i).

Next, a description is given of a case where the data addition apparatus 20(i) acquires the trapdoor hash values and parameters from the plurality of data addition apparatuses 20. When m is a natural number not more than n−i, the data input/output unit 22 of the data addition apparatus 20(i) acquires the trapdoor hash value(i+1) to trapdoor hash value (i+m) and the parameters(i+1) to parameters(i+m) outputted by the data addition apparatus 20(i+1) to data addition apparatus 20(i+m), respectively and sets the created data(i), the trapdoor hash value(i+1) to trapdoor hash value(i+m), the parameters(i+1) to parameters(i+m) as the additional data (i). When j is not more than m, the data additional apparatus 20(i+j) sets the created data(i+j) as the additional data(i+j).

The electronic signature verification apparatus is the same as that of the first embodiment, and the description thereof is omitted.

In the third embodiment, as described in the second embodiment, the electronic signature attaching apparatus 10 or the data addition apparatuses 20 may output the place holder for specifying the place where the additional data is inserted.

With the multi signature verification system according to the third embodiment, when the plurality of data addition apparatuses add data to original data with a signature attached thereto, it is not necessary to attach an electronic signature to each piece of additional data, thus shortening the calculation time required for signing.

With the electronic signature attaching apparatus according to the third embodiment, the electronic signature can be attached to the trapdoor hash value and identification information (parameters) of the plurality of data addition apparatuses.

With the data addition apparatus according to the third embodiment, the validity can be guaranteed by adding the identification information and trapdoor hash values of the plurality of data addition apparatuses to the acquired data and attaching the determination value together.

FOURTH EMBODIMENT

In a fourth embodiment of the present invention, a description is given of a case where the electronic signature attaching apparatus 10 does not output the acquired trapdoor hash value and the additional data of each data addition apparatus 20 does not include the trapdoor hash value. The configuration of the multi signature verification system is the same as that of the first embodiment. Hereinafter, the electronic signature attaching apparatus 10, data addition apparatus 20(i), and the electronic signature verification apparatus 30 are described in detail.

The electronic signature attaching unit 11 of the electronic signature attaching apparatus 10 attaches an electronic signature to the original data, the trapdoor hash value(1), and parameters(1), and the data input/output unit outputs the original data, the parameters (1), and the electronic signature.

Figure 11:
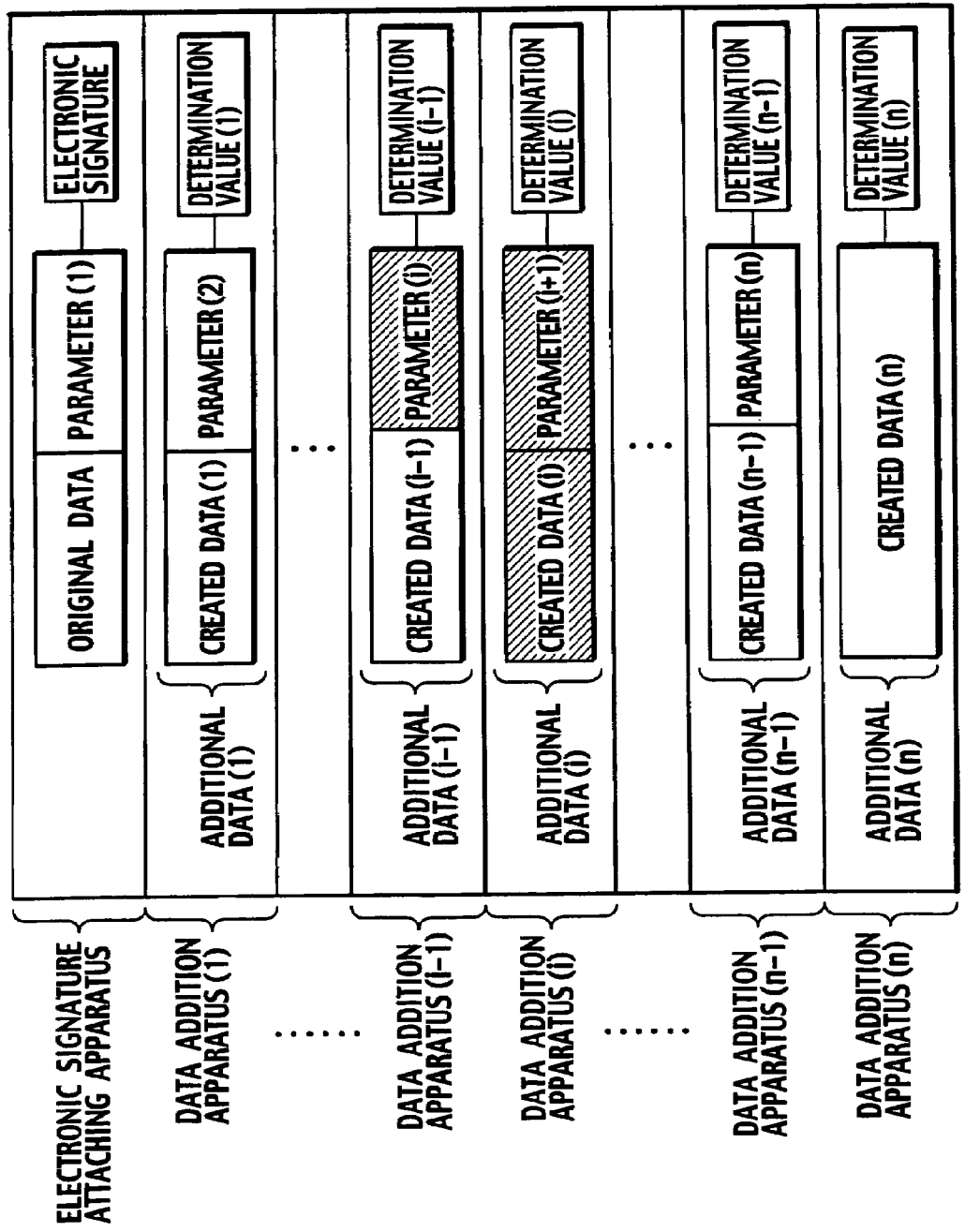
FIG. 11 is an example of data acquired by an electronic signature verification apparatus according to a fourth embodiment.

The data adding unit 23 of the data addition apparatus 20(i) sets the original data and parameters(i+1) as the additional data(i). The determination value calculating unit 24 calculates the determination value(i) from the additional data(i) and trapdoor hash value(i+1) set as mi. In this case, the data acquired by the electronic signature verification apparatus 30 is as shown in FIG. 11. The trapdoor hash value(1) is calculated by the trapdoor hash value calculating unit 32. The trapdoor hash value(1) is calculated from the additional data (1), the trapdoor hash value(2), and the determination value (1), and the trapdoor hash value(2) is necessary. Similarly, deriving the trapdoor hash value(i) for i not more than n−1 requires the trapdoor hash value(i+1). Herein, the trapdoor hash value(n) can be derived because the trapdoor hash value (n) is calculated from the created data(n) of the data addition apparatus 20(n) and determination value(n). Accordingly, the trapdoor hash value(1) can be derived by recursively calculating the trapdoor hash values with the trapdoor hash value calculating unit 32. The electronic signature verifying unit 32 verifies the signature attached to the thus calculated trapdoor hash value(1). When the trapdoor hash value(1) is valid as a result of the verification, the validity of all the additional data(1) to additional data(n) used for deriving the trapdoor hash value(1) is guaranteed.

In the fourth embodiment, as described in the second embodiment, the electronic signature attaching apparatus 10 or the data addition apparatuses 20 may be adapted to output the place holder for specifying the place where the additional data is inserted.

With the multi signature verification system according to the fourth embodiment, the electronic signature attaching apparatus and the data addition apparatuses do not output the trapdoor hash values, and accordingly the amount of data outputted is reduced.

With the electronic signature attaching apparatus according to the fourth embodiment, no trapdoor hash value is outputted, and accordingly, the amount of data outputted is reduced.

With the data addition apparatuses according to the fourth embodiment, the trapdoor hash value is not added to the acquired data, and the amount of data outputted is reduced.

With the electronic signature verification apparatus according to the fourth embodiment, the trapdoor hash value (1) to trapdoor hash value(n) of the respective data addition apparatuses can be derived from the created data(n) and determination value(n) of the data addition apparatuses 20(n). The validity of all the pieces of additional data can be verified by verifying the electronic signature attached thereto.

FIFTH EMBODIMENT

Figure 12:
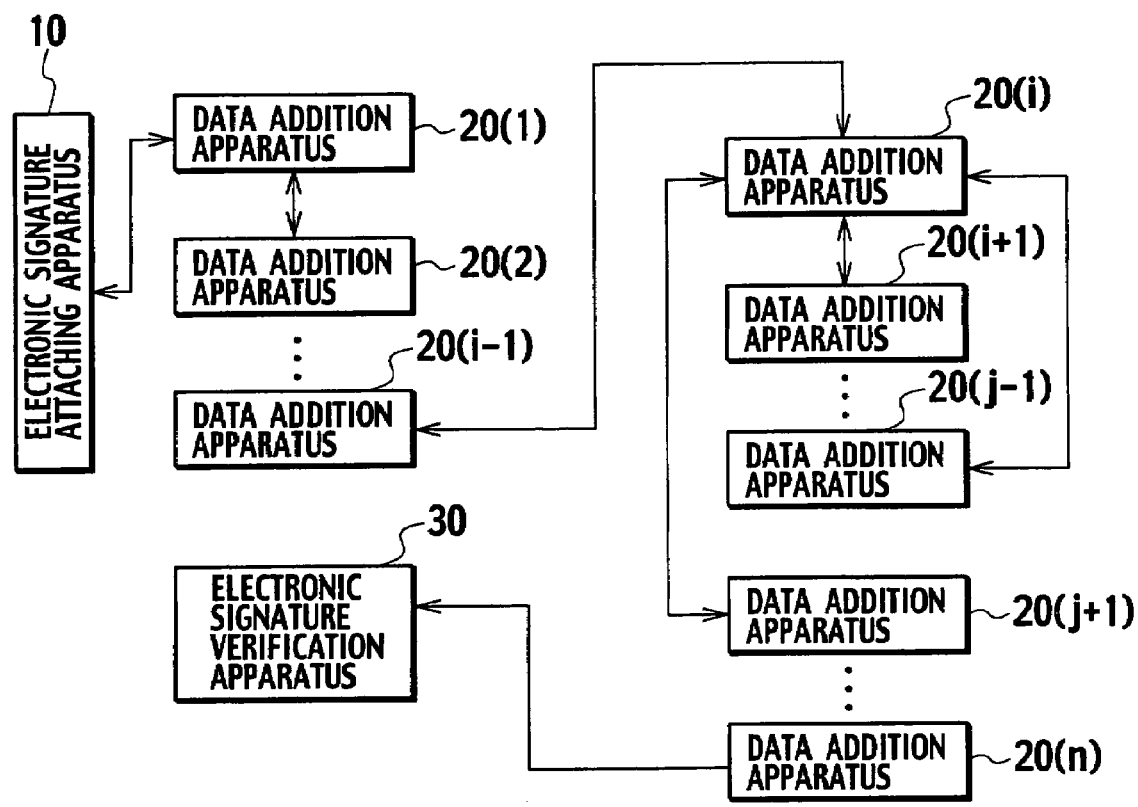
FIG. 12 is a block diagram of a multi signature verification system according to a fifth embodiment.

In a fifth embodiment of the present invention, as shown in FIG. 12, a description is given to the case where the data addition apparatus 20(i) adds data j-th again in the second embodiment. A method of adding data again is creating one trapdoor hash value for each piece of additional data or creating only one trapdoor hash value to the pieces of additional data. Herein, the case of creating the trapdoor hash value for each piece of additional data corresponds to the case where the data addition apparatus 20 (i) acts as the data addition apparatus 20(j) in the second embodiment, and the description thereof is omitted.

Hereinafter, addition of data more than once using one trapdoor hash value is described in detail. Specifically, a case is considered where j is a natural number more than i+1 and the data additional apparatus 20(i) acquires data from the data addition apparatus 20(i−1) and adds data i-th again. The following description is given of a case where the data addition apparatus 20(i) adds data twice, but actually, applying this embodiment over and over allows data addition more than twice.

The data addition apparatus 20(i), as described in the second embodiment, outputs the additional data(i) and the determination value(i) when acquiring the data from the data addition apparatus 20(i−1). When the data addition apparatus 20(j−i) acquires the data including the additional data (i) and determination value (i), the data addition apparatus 20(j−1) outputs the parameters(i) and trapdoor hash value(i) outputted by the data addition apparatus 20(i) and the created data (j−1) as the additional data(j−1) together with the determination value(j−1). The data addition apparatus 20(i) which adds data j-th again acquires the parameters(j+1) and trapdoor hash value(j+1). The created data(j), the parameters(j+1), and the trapdoor hash value(j+1) are added to the acquired data as the additional data and outputted together with the determination value(j).

The operations of the electronic signature attaching apparatus 10 and electronic signature verification apparatus 30 according to the fifth embodiment are the same as those of the second embodiment, and the description thereof is omitted.

In the fifth embodiment, as described in the second embodiment, the electronic signature attaching apparatus 10 or data addition apparatuses 20 may be adapted to output the place holder for specifying the place where the additional data is inserted.

With the multi signature verification system according to the fifth embodiment, a same data addition apparatus can add data two or more times.

With the data addition apparatuses according to the fifth embodiment, it is possible to add data to a single piece of data over and over.

OTHER EMBODIMENTS

The present invention is described with the aforementioned first to fifth embodiments, but it should not be understood that the description and drawings constituting a part of this disclosure limit the present invention. From this disclosure, various modified examples, examples, and operation technologies will be apparent to those skilled in the art. For example, in the first to fifth embodiments, the electronic signature attaching apparatus, the data addition apparatuses, and the electronic signature verification apparatus have been described as different units, but these functions can be integrated as a single unit.

Similarly, each of the electronic signature attaching apparatus, the data addition apparatus, and the electronic signature verification apparatus has the plurality of functions, but the functions may be adapted to operate in separate units. For example, in the data addition apparatus, the trapdoor hash value creating unit and the determination value calculating unit may be arranged in different apparatuses. In this case, these function units are linked with wired or wireless connections.

Various modifications will become possible for those skilled in the art after receiving the teachings of the present disclosure without departing from the scope thereof.

What is claimed is:

1. A multi-signature verification system configured to add an additional data to an original data previously created and configured to verify the original data and the additional data, the system comprising:
   an electronic signature attaching apparatus including an electronic signature attaching unit configured to attach an electronic signature to the original data previously created, to a first trapdoor hash value created by a data addition apparatus, and to an identification information;
   the data addition apparatus including:
   a data adding unit configured to add additional data including at least new created data to the original data; and
   a determination value calculating unit configured to calculate a determination value distinct from the electronic signature, such that an output of a trapdoor hash function using the determination value and the additional data as an input is equal to the first trapdoor hash value created by the data addition apparatus; and
   an electronic signature verification apparatus including:
   a trapdoor hash value calculating unit configured to calculate a second trapdoor hash value based on the additional data and the determination value; and
   a verifying unit configured to verify the additional data by comparing the second trapdoor hash value calculated by the trapdoor hash value calculating unit and the first trapdoor hash value created by the data addition apparatus, wherein
   the identification information identifies the data addition apparatus which has created the first trapdoor hash value.

2. The multi signature verification system of claim 1, wherein the identification information is parameters created when the first trapdoor hash value is created.

3. A data addition apparatus attaching new data to original data created in an electronic signature attaching apparatus, comprising:

a trapdoor hash value creating unit configured to create a first trapdoor hash value;

a first outputting unit configured to output the first trapdoor hash value created by the trapdoor hash value creating unit and identification information identifying a data addition apparatus which has created the first trapdoor hash value;

a data adding unit configured to add additional data including at least new created data to the original data;

a determination value calculating unit configured to calculate a determination value distinct from the electronic signature, such that a second trapdoor hash value output from a trapdoor hash function using the determination value and the additional data as input is equal to the first trapdoor hash value created by the trapdoor hash value creating unit; and a second outputting unit configured to output the additional data and the determination value.

4. The data addition apparatus of claim 3, wherein the data addition apparatus corresponds to i data addition apparatuses; and the additional data added by the data adding unit of i-th data addition apparatus includes a i−1-th trapdoor hash value and a i−1-th identification information which are outputted by the first outputting unit of the i−1-th data addition apparatus, in addition to new created data output by the i-th data addition apparatus.

5. The data addition apparatus of claim 4, further comprising an acquiring unit configured to acquire a trapdoor hash value and a piece of identification information from each of (i+1)-th to (i+m)-th data addition apparatuses, m being a natural number not less than 1, wherein the additional data includes new created data and a trapdoor hash value and identification information acquired by each of the (i+1)-th to (i+m)-th data addition apparatuses.

6. The data addition apparatus of claim 3, further comprising a creating unit configured to create a place holder specifying a place where the data is added.

7. An electronic signature verification apparatus configured to verify original data previously created and additional data added to the original data, the apparatus comprising:

a data acquiring unit configured to acquire the additional data including at least new created data and a determination value, the determination value being a value such that a first trapdoor hash value output from a trapdoor hash function using the determination value and the additional data as an input is equal to a second trapdoor hash value created by a data addition apparatus;

a trapdoor hash value calculating unit configured to calculate the first trapdoor hash value based on the additional data and the determination value, the determination value being distinct from the electronic signature; and a verifying unit configured to verify the additional data by comparing the first trapdoor hash value calculated by the trapdoor hash value calculating unit and the second trapdoor hash value created by the data addition apparatus.

8. The electronic signature verification apparatus of claim 7, wherein the electronic signature verification apparatus is configured to acquire data including n pieces of additional data each including a trapdoor hash value, n being a natural number not less than 1, and the trapdoor hash value calculating unit is configured to calculate first to n-th trapdoor hash values based on first to n-th pieces of additional data and first to n-th determination values, and the verifying unit is configured to verify first to n-th additional data by comparing the first to n-th trapdoor hash values included in the acquired data and the first to n-th trapdoor hash values calculated by the trapdoor hash value calculating unit.

9. The electronic signature verification apparatus of claim 7, wherein the electronic signature verification apparatus is configured to acquire data including n pieces of additional data each including no trapdoor hash value, n being a natural number not less than 1, and the trapdoor hash value calculating unit is configured to recursively repeat a calculation step until the first trapdoor hash value is calculated, the calculation step being calculating the n-th trapdoor hash value based on the n-th additional data and the n-th determination value and calculating the (n−1)-th trapdoor hash value based on the (n−1)-th additional data, the n-th trapdoor hash value, and the (n−1)-th determination value, and the verifying unit is configured to verify the first to n-th additional data by verifying the first to n-th trapdoor hash values by use of the electronic signature.

* * * * *